United States Patent [19]

Wood

[11] Patent Number: 5,195,605
[45] Date of Patent: Mar. 23, 1993

[54] APPARATUS FOR MOUNTING A STEERABLE GROUND ENGAGING WHEEL OF A VEHICLE

[75] Inventor: Ruey E. Wood, St. Clair Shores, Mich.

[73] Assignee: TRW Inc., Lyndhurst, Ohio

[21] Appl. No.: 676,861

[22] Filed: Mar. 28, 1991

[51] Int. Cl.⁵ .............................................. B60K 17/30
[52] U.S. Cl. ..................................... 180/254; 280/96.1
[58] Field of Search ............... 180/254, 253, 256, 258; 280/96.1, 661; 403/140

[56] References Cited

U.S. PATENT DOCUMENTS

| | | | |
|---|---|---|---|
| 2,752,178 | 6/1956 | Hoffman | 403/51 |
| 2,917,123 | 12/1959 | Ainsworth | 180/254 |
| 2,998,262 | 8/1961 | Hoffman | 280/96.1 X |
| 3,127,192 | 3/1964 | Trangott et al. | 280/96.1 |
| 3,253,670 | 5/1966 | Thomas et al. | 180/254 |
| 3,472,331 | 10/1969 | Baker et al. | 180/254 |
| 4,037,680 | 7/1977 | Grove | 180/254 |
| 4,195,862 | 4/1980 | Specktor et al. | 180/253 X |
| 4,232,880 | 11/1980 | Dickerson et al. | 280/661 |
| 4,509,772 | 4/1985 | Drotar et al. | 280/661 |
| 4,519,626 | 5/1985 | Murphy et al. | 280/661 |
| 4,722,540 | 2/1988 | Kozyra et al. | 280/96.1 X |
| 5,012,885 | 5/1991 | Hilden | 180/254 |

Primary Examiner—Margaret A. Focarino
Assistant Examiner—Kevin Hurley
Attorney, Agent, or Firm—Tarolli, Sundheim & Covell

[57] ABSTRACT

A steering yoke has coaxial spaced apart passages. A spindle connection supports a vehicle wheel for steering movement relative to the yoke about an axis corresponding with the axis of the passages. The spindle connection has upper and lower openings therethrough coaxial with the passages. A pair of ball joints interconnects the yoke and the spindle connection for relative rotational movement about the axis. A stud of one of the ball joints is located in a predetermined position in one of the passages. A stud of the other one of the ball joints is located in a position in the other one of the passages in response to positioning the stud of the one ball joint in the predetermined position. The stud of the one ball joint is secured in the predetermined position in the one passage in the yoke. The stud of the other ball joint is secured in the position in the other passage in the yoke. The position of the stud of the other ball joint depends upon the predetermined position of the stud of the one ball joint.

10 Claims, 3 Drawing Sheets

APPARATUS FOR MOUNTING A STEERABLE GROUND ENGAGING WHEEL OF A VEHICLE

BACKGROUND OF THE INVENTION

1. Technical Field

The present invention relates to an apparatus for mounting a steerable ground engaging wheel of a vehicle, and is particularly directed to an apparatus for mounting a steerable ground engaging wheel which is also driven.

2. Background Art

The front ground engaging wheels of a front wheel drive vehicle are driven and are steerable. These steerable driven ground engaging wheels are mounted in different ways. Typically, a steerable driven ground engaging wheel is mounted on a spindle connection. The spindle connection is connected to a yoke by upper and lower ball joints. The yoke is fixedly connected with the vehicle frame. The upper and lower ball joints support the spindle connection for rotational movement about a steering axis relative to the yoke.

Commonly, the upper ball joint has a tapered ball stud received in a correspondingly tapered hole in the upper part of the yoke. Similarly, the lower ball joint has a tapered ball stud received in a correspondingly tapered hole in the lower part of the yoke. Each tapered ball stud is located in a predetermined position in its tapered hole in the yoke independently of the position of the tapered ball stud of the other ball joint in its tapered hole in the yoke. Thus, the position of one ball joint is independent of the position of the other ball joint.

SUMMARY OF THE INVENTION

In accordance with the present invention, a steerable vehicle wheel is supported on a spindle connection. The spindle connection is connected to a yoke by a pair of ball joints. The yoke is fixedly connected with the vehicle frame. The pair of ball joints support the spindle connection for rotational movement about a steering axis relative to the yoke.

The yoke has first and second coaxial spaced apart passages. The spindle connection has a pair of openings coaxial with the passages in the yoke. A first ball joint has a first socket secured in one opening in the spindle connection and a first stud supported in the first socket for rotational movement about the steering axis relative to the first socket. The first stud extends from the first socket into one of the passages in the yoke. A second ball joint has a second socket secured in another opening in the spindle connection and a second stud supported in the second socket for rotational movement about the steering axis relative to the second socket. The second stud extends from the second socket into the other passage in the yoke.

During assembly, the socket of one ball joint is fastened in one opening of the spindle connection and the socket of the other ball joint is fastened in the other opening in the spindle connection. The studs of the ball joints are then inserted into the passages in the yoke. One of the studs is located in a predetermined position in one of the passages in the yoke. The other stud is located in the other one of the passages in the yoke in a position dependent upon the predetermined position of the one stud. The position of the other stud in the other one of the passages in the yoke will vary depending on manufacturing tolerances of the different parts.

In one embodiment, the one stud is located in its predetermined position by engagement of the end of the stud with a yoke surface which closes the end of the passage in the yoke in which the one stud is received. A first pinch bolt clamps portions of the yoke around the one stud to hold the stud in its predetermined position. The one stud has an axially extending groove along its outer perimeter through which the first pinch bolt extends. The groove enables the position of the one stud relative to the first pinch bolt to vary. When the first pinch bolt is tightened, the portions of the yoke are clamped around the one stud to prevent axial movement of the one stud in the one of the passages in the yoke.

A second pinch bolt clamps portions of the yoke around the other stud. The other stud has an axially extending groove along its outer perimeter through which the second pinch bolt extends. The groove enables the position of the other stud relative to the second pinch bolt to vary. When the second pinch bolt is tightened, the portions of the yoke are clamped around the other stud to prevent axial movement of the other stud in the other one of the passages in the yoke.

In another embodiment, the one stud may be tapered and the one of the passages in the yoke may be correspondingly tapered. The tapered stud is inserted into the tapered passage and is located in the predetermined position by engagement of the tapered surfaces of the stud and the passage. The other stud is located in the other one of the passages in the yoke in a position dependent upon the predetermined position of the one stud. A pinch bolt is used to maintain the other stud in its position relative to the yoke in the same manner as described hereinabove in connection with the one embodiment.

BRIEF DESCRIPTION OF THE DRAWINGS

The foregoing and other features of the present invention will become apparent to one skilled in the art upon consideration of the following description of the invention with reference to the accompanying drawings, wherein.

DESCRIPTION OF PREFERRED EMBODIMENTS

Figure 1:
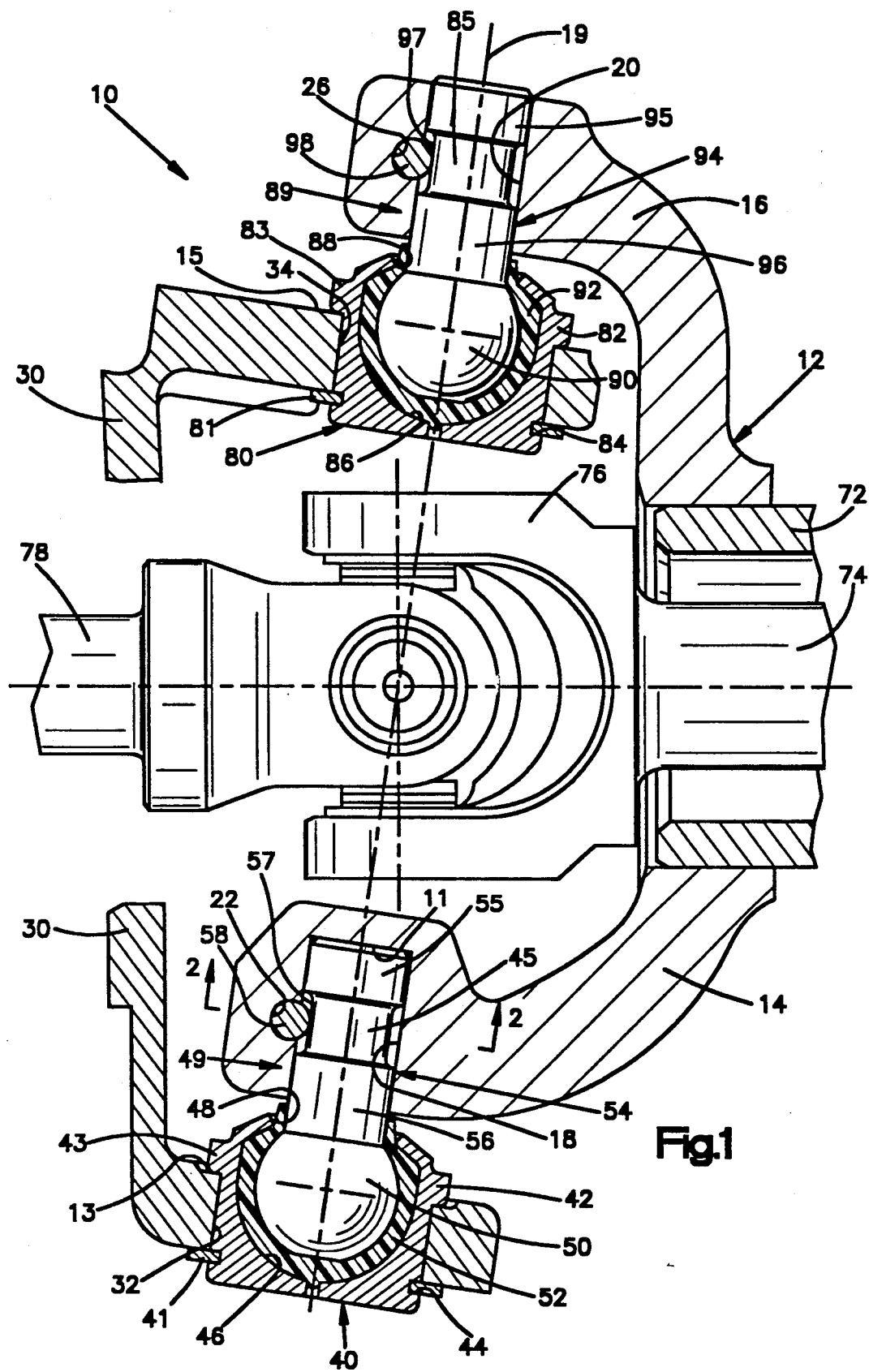
FIG. 1 is a schematic illustration of a vehicle wheel mounting apparatus constructed in accordance with the present invention.

The present invention relates to an apparatus for mounting a ground engaging steerable vehicle wheel. The specific construction of the apparatus may vary. By way of example, the present invention is illustrated in FIG. 1 as embodied in a vehicle wheel mounting apparatus 10.

As is known, a vehicle wheel (not shown) is mounted on a wheel spindle connection 30 and is rotatable relative to the wheel spindle connection 30. The vehicle wheel is driven by rotation of an engine driven shaft 74 which extends through a housing 72. The housing 72 is fixed to the vehicle frame. Rotation is transmitted from the shaft 74 to the vehicle wheel through a universal joint 76 of known construction and a driven shaft 78.

The wheel spindle connection 30 is connected to a steering yoke 12 by a pair of ball joints 40, 80 for turning movement about a steering axis 19 relative to the steering yoke 12. The wheel spindle connection 30 and the steering yoke 12 are made of nodular cast iron.

Steering Yoke

As shown in FIG. 1, the steering yoke 12 has a lower portion 14 and an upper portion 16. The lower portion 14 of the yoke 12 has a passage 18 in the form of a blind-hole which is closed at one end by a surface 11 of the yoke 12. The axis of the passage 18 lies on the steering axis 19. The lower portion 14 has a passage 22 for receiving a pinch bolt 58. The passage 22 extends transverse to the axis 19 and partially intersects passage 18.

The upper portion 16 of the yoke 12 has a passage 20 in the form of a through-hole. The axis of the passage 20 lies on the steering axis 19. The passage 20 is coaxial with the blind-hole 18 in the lower portion 14 of the yoke 12. The upper portion 16 of the yoke 12 also has a passage 26 for receiving a pinch bolt 98. The passage 26 extends transverse to the axis 19 and partially intersects passage 20.

Spindle Connection

The spindle connection 30 supports the vehicle wheel, in a known manner, for steering movement relative to the yoke 12 about the axis 19. The spindle connection 30 has a lower opening 32 for receiving a portion of the ball joint 40 and an upper opening 34 for receiving a portion of the ball joint 80. The lower and upper openings 32, 34 are coaxial with the blind-hole 18 and the through-hole 20. The axes of the openings 32, 34 lie on the steering axis 19.

Lower Ball Joint

The lower ball joint 40 includes a joint housing 42 press-fit into the lower opening 32 of the spindle connection 30. The joint housing 42 has a groove 44 along its outer periphery for receiving an optional snap-ring 41 which maintains the lower ball joint 40 in the lower opening 32 of the spindle connection 30. The joint housing 42 has a rim 43 which engages a surface 13 of the yoke 12. The joint housing 42 also has a chamber 46 and has an opening 48 extending into the chamber 46. The joint chamber housing 42 is cold-formed from SAE 1030 steel. Alternately, the joint housing 42 could be formed of any SAE/ASTM grade of material suitable to meet the strength, ductility, and formability requirements of the process and the final product application.

The lower ball joint 40 further includes a ball stud 49 having a ball head portion 50 disposed in the chamber 46 and a stud portion 54 extending away from the ball head portion 50 through the opening 48 in the joint housing 42. The ball stud 49 is preferably formed of SAE 8115, 8615, 8640, or similar grade steel which is cold formed or machined, carburized or carbonitrided to a 20-30 Rc core hardness and a 0.006-0.015 inch case depth, and supplied by Republic Steel. The ball head portion 50 has a center which lies on the axis 19. The ball stud 49 is rotatable about the axis 19 relative to the chamber 46 and is pivotable relative to the joint housing 42 about the center of the ball head portion 50. A bearing 52 is disposed in a known manner between the joint housing 42 and the ball head portion 50. The bearing 52 is preferably formed of natural rubber or a synthetic equivalent of natural rubber. Most preferably, the bearing 52 is formed of natural rubber which is Banbury mixed and insert molded by injection and/or compression molding and supplied by Yale-South Haven, Inc. of South Haven, Mich.

The stud portion 54 has a top portion 55 and a bottom portion 56 which are of the same diameter. An intermediate portion 45 interconnects the top portion 55 and bottom portion 56 and is coaxial with, but of a smaller diameter than the top and bottom portions 55, 56. Thus, the outer perimeter of the stud portion 54 has a groove 57. The groove 57 extends axially along the outer perimeter of the stud portion 54 and circumferentially around the stud portion 54.

Lower Pinch Bolt

Figure 2:
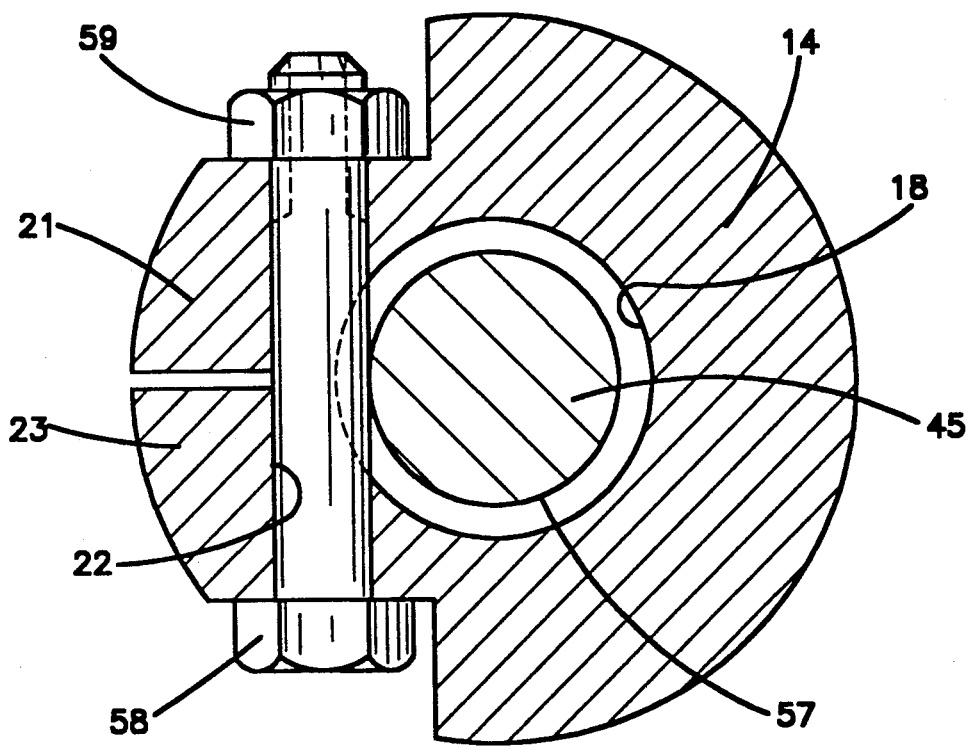
FIG. 2 is a cross-sectional view of a portion of the vehicle wheel mounting apparatus of FIG. 1 taken approximately along the line 2—2 in FIG. 1.

As shown in FIG. 2, the pinch bolt 58 is located in the passage 22 of the lower portion 14 of the yoke 12 and in the groove 57 of the stud portion 54. As shown in FIG. 2, the pinch bolt 58 has conventional threads onto which a conventional nut 59 is threaded. When the pinch bolt 58 and the nut 59 are tightened together, the pinch bolt 58 and nut 59 force opposite portions 21, 23 of the yoke 12 to clamp around the top and bottom portions 55, 56 of the stud portion 54. This clamping force prevents axial movement of the ball stud 49 within the blind-hole 18.

Upper Ball Joint

The upper ball joint 80 includes a joint housing 82 press-fit into the upper opening 34 of the spindle connection 30. The joint housing 82 has a groove 84 along its outer periphery for receiving an optional snap-ring 81 which maintains the upper ball joint 80 in the upper opening 34 of the spindle connection 30. The joint housing 82 has a rim 83 which engages a surface 15 of the yoke 12. The joint housing 82 also has a chamber 86 and has an opening 88 extending into the chamber 86. The joint housing 82 is cold-formed from SAE 1030 steel. Alternately, the joint housing 82 could be formed of any SAE/ASTM grade of material suitable to meet the strength, ductility, and formability requirements of the process and the final product application.

The upper ball joint 80 further includes a ball stud 89 having a ball head portion 90 disposed in the chamber 86 and a stud portion 94 extending away from the ball head portion 90 through the opening 88 in the joint housing 82. The ball stud 89 is preferably formed of the same material as the ball stud 49 as described hereinabove. The ball head portion 90 has a center which lies on the axis 19. The ball stud 89 is rotatable about the axis 19 relative to the chamber 86 and is pivotable relative to the joint housing 82 about the center of the ball head portion 90. A bearing 92 is disposed in a known manner between the joint housing 82 and the ball head portion 90. The bearing 92 is preferably formed of the same material as the bearing 52 as described hereinabove.

The stud portion 94 has a top portion 95 and a bottom portion 96 which are of the same diameter. An intermediate portion 85 interconnects the top portion 95 and the bottom portion 96 and is coaxial with, but of a smaller diameter than the top and bottom portions 95, 96. Thus, the outer perimeter of the stud portion 94 has a groove 97. The groove 97 extends axially along the outer perimeter of the stud portion 94 and circumferentially around the stud portion 54.

Upper Pinch Bolt

The pinch bolt 98 is located in the passage 26 of the upper portion 16 of the yoke 12 and in the groove 97 of the stud portion 94. Like the pinch bolt 58 shown in FIG. 2, the pinch bolt 98 has conventional threads onto which a conventional nut (not shown) is threaded. When the pinch bolt 98 and the nut are tightened together, the pinch bolt 98 and the nut force opposite portions of the yoke 12 to clamp around the top and bottom portions 95, 96 of the stud portion 94. This clamping force prevents axial movement of the ball stud 89 within the through-hole 20.

Assembly Procedure

During assembly of the vehicle wheel mounting apparatus 10, the lower ball joint 40 is press fit into the lower opening 32 of the spindle connection 30 and located with the rim 43 engaging the surface 13 of the yoke 12. The upper ball joint 80 is press fit into the upper opening 34 of the spindle connection 30 and located with the rim 83 engaging the surface 15 of the yoke 12. After the lower and upper ball joints 40, 80 are securely fastened to the spindle connection 30, the stud portion 54 of the lower ball joint 40 is inserted into the blind-hole 18 in the lower portion 14 of the yoke 12 and the stud portion 94 of the upper ball joint 80 is simultaneously inserted into the through-hole 20 in the upper portion 16 of the yoke 12. The stud portion 54 is inserted into the blind-hole 18 until the stud portion 54 engages the surface 11 of the yoke 12. This positions the lower ball joint 40 in a predetermined position. The upper ball joint 80 is then located in a position dependent upon the position of the lower ball joint 40.

The lower ball joint 40 is then secured to the lower portion 14 of the yoke 12 by inserting the pinch bolt 58 into the passage 22 of the lower portion 14 of the yoke 12 and into groove 57 of the stud portion 54 and tightening the nut onto the pinch bolt 58. When the lower ball joint 40 is secured to the lower portion 14 of the yoke 12, the ball stud 49 is secured in a predetermined position in the blind-hole 18. When the ball stud 49 of the lower ball joint 40 is secured in the predetermined position in the blind-hole 18, the ball stud 89 of the upper ball joint 80 is located in position in the through-hole 20. The upper ball joint 80 is secured to the upper portion 16 of the yoke 12 by inserting the pinch bolt 98 into the passage 26 of the upper portion 16 of the yoke 12 and into the groove 97 of the stud portion 94 and tightening a nut onto the pinch bolt 98.

Advantages

By constructing the vehicle ground engaging wheel mounting apparatus 10 in the manner described above, a number of different advantages results. One advantage is that tension forces acting on either the lower ball joint 40 or the upper ball joint 80 are minimized. Tension forces acting on the upper and lower ball joints 40, 80 are minimized because each of the ball studs 49, 89 is located in a position of minimum stress in its associated passage before the particular ball stud is secured to the yoke 12. As described above, the ball stud 89 finds its position dependent upon the position of the ball stud 49. By permitting each of the ball studs 49, 89 to be located in a position of minimum stress in its associated passage relative to the yoke 12 before securing the particular ball stud to the yoke 12, stresses such as tension forces which may otherwise act on the particular ball joint due to manufacturing tolerances of parts are minimized, and load forces acting on the mounting apparatus 10 are substantially equally shared between the lower and upper ball joints 40, 80. Tension forces acting on the ball joints 40, 80 tend to pull the ball joints 40, 80 apart. When tension forces acting on the ball joints 40, 80 are minimized, undue wear on each of the ball joints 40, 80 is reduced resulting in a longer life for the ball joints 40, 80.

Second Embodiment

Figure 3:
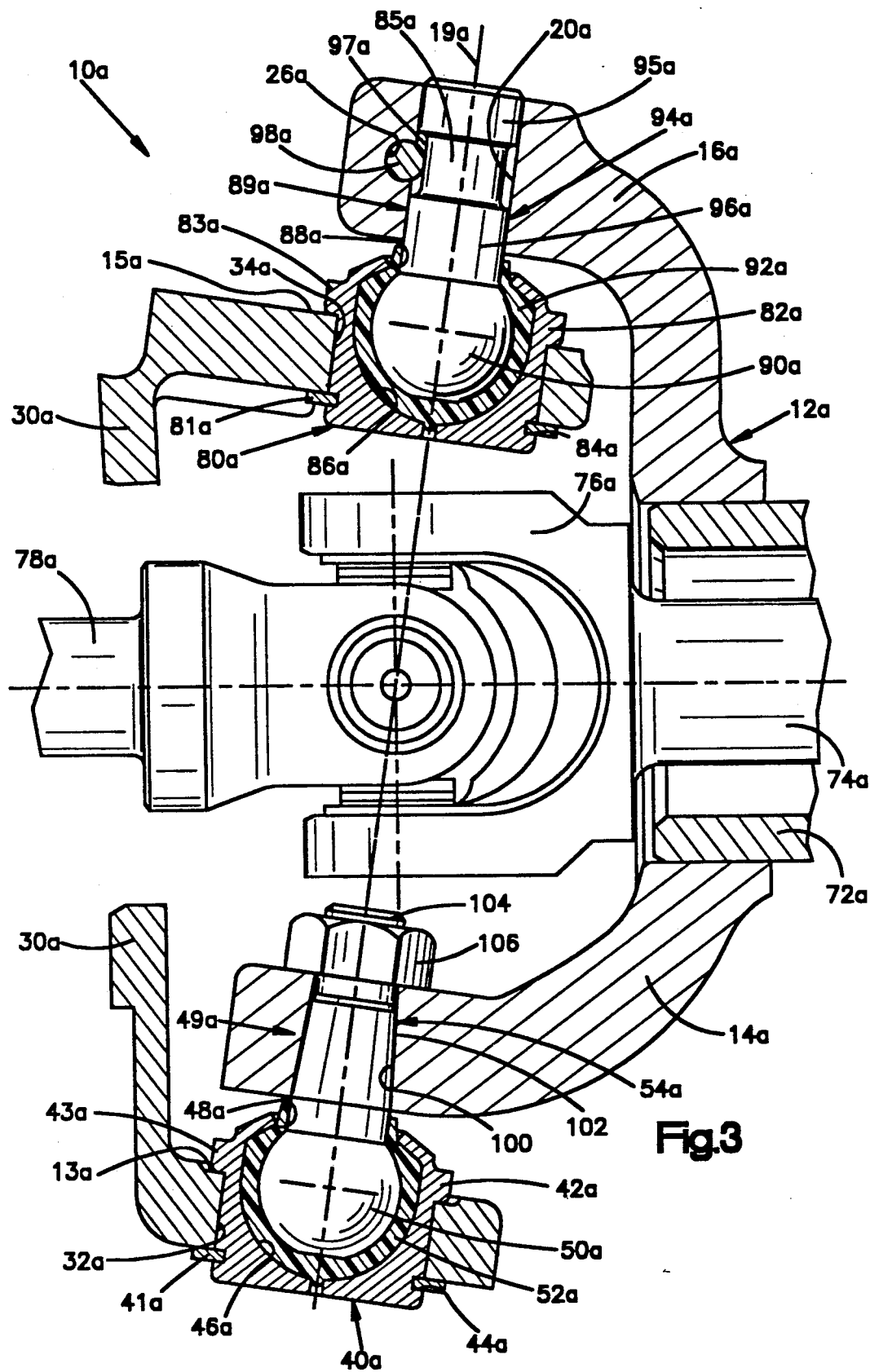
FIG. 3 is a schematic illustration of another embodiment of the present invention.

Another embodiment of the present invention is illustrated in FIG. 3. Since the embodiment of the invention illustrated in FIG. 3 is generally similar to the embodiment of the invention illustrated in FIG. 1, similar numerals are utilized to designate similar components, the suffix letter "a" being associated with the embodiment of FIG. 3 to avoid confusion. As shown in FIG. 3, the lower portion 14a of the yoke 12a has a passage 100 in the form of a tapered hole. The ball stud 49a has a tapered portion 102 corresponding to the tapered hole 100 in the lower portion 14a of the yoke 12a and a threaded portion 104 on which a nut 106 is threaded.

During assembly of the mounting apparatus 10a, the lower and upper ball joints 40a, 80a are securely fastened to the spindle connection 30a in the same manner as previously described with reference to the embodiment shown in FIG. 1. After the lower and upper ball joints 40a, 80a are securely fastened to the spindle connection 30a, the stud portion 54a of the ball stud 49a is inserted into the tapered hole 100 in the lower portion 14a of the yoke 12a and the stud portion 94a of the upper ball joint 80a is simultaneously inserted into the through-hole 20a in the upper portion 16a of the yoke 12a.

The lower ball joint 40a is then secured to the lower portion 14a of the yoke 12a by threading the nut 106 onto the threaded portion 104 of the stud portion 54a of the ball stud 49a. When the lower ball joint 40a is secured to the lower portion 14a of the yoke 12a, the tapered portion 102 of the stud portion 54a abuts against the surface in the tapered hole 100 in the lower portion 14a of the yoke 12a. The lower ball joint 40a is thereby secured relative to the yoke 12a.

After the lower ball joint 40a is secured to the lower portion 14a of the yoke 12a, the upper ball joint 80a is secured to the upper portion 16a of the yoke 12a by inserting the pinch bolt 98a into the passage 26a in the upper portion 16a of the yoke 12a and into the groove 97a in the stud portion 94a and tightening a nut onto the pinch bolt 98a. The upper ball joint 80a is secured to the upper portion 16a of the yoke 12a in the same manner as previously described with reference to the embodiment shown in FIG. 1. By assembling the mounting apparatus 10a in the manner as described with reference to the embodiment shown in FIG. 3, the same advantages result as described hereinabove with reference to the embodiment shown in FIG. 1.

This invention has been described above with reference to preferred embodiments. Modifications and alterations may become apparent to one skilled in the art upon reading and understanding this specification. It is intended to include all such modifications and alterations within the scope of the appended claims.

Having described the invention, the following is claimed:

1. An apparatus comprising:
   a first member having first and second coaxial spaced apart passages;
   a second member for supporting a vehicle wheel for steering movement about an axis relative to said first member corresponding with the axis of said passages, said second member having upper and lower openings therethrough coaxial with said first and second passages;

first and second ball joints for interconnecting said first and second members for relative pivotal movement about said axis;

said first ball joint having a first socket secured in said lower opening and a first stud supported in said first socket for rotational movement about said axis relative to said first socket and extending from said first socket into said first passage;

said second ball joint having a second socket secured in said upper opening and a second stud supported in said second socket for rotational movement about said axis relative to said second socket and extending from said second socket into said second passage;

said first member including means for locating the stud associated with one of said ball joints in a first predetermined position of minimum stress in one of said passages, the stud associated with the other one of said ball joints being located in a second predetermined position of minimum stress in the other one of said passages in response to positioning said stud associated with said one ball joint in said first predetermined position of minimum stress;

means for securing said stud of said one ball joint in said first predetermined position of minimum stress in said one passage; and means for securing said stud of said other ball joint in said second predetermined position of minimum stress in said other passage in which it is located in response to positioning said stud of said one ball joint in said first predetermined position of minimum stress, said first and second ball joints substantially equally sharing load forces acting on said apparatus when said stud of said one ball joint is in said first predetermined position of minimum stress and said stud said other ball joint is in said second predetermined position of minimum stress.

2. An apparatus as defined in claim 1 wherein said means for locating the stud associated with one of said ball joints includes a surface portion of said first member against which said stud of said on ball joint abuts and which closes said one passage in which said stud of said one ball joint is located to define a blind-hole.

3. An apparatus as defined in claim 11 wherein said stud of said one ball joint is tapered and said means for locating the stud associated with one of said ball joints includes a portion of said first member defining a tapered hole, said tapered hole receiving said tapered stud of said one ball joint.

4. An apparatus comprising:
a vehicle frame member;
a vehicle wheel supporting member for supporting a vehicle wheel for steering movement about a steering axis relative to said vehicle frame member; and
first and second ball joints for interconnecting said vehicle frame member and said vehicle wheel supporting member for relative movement about said steering axis;
each of said ball joints including a first portion secured to said vehicle wheel supporting member and a second portion secured to said vehicle frame member;
said vehicle frame member including means for locating said second portion of one of said ball joints in a first predetermined position of minimum stress relative to said vehicle frame member;
said vehicle wheel supporting member comprising means for locating said second portion of the other one of said ball joints in a second predetermined position of minimum stress relative to said vehicle frame member which is dependent upon said first predetermined position of minimum stress of said second portion of said one ball joint, said first and second ball joints substantially equally sharing load forces acting on said apparatus when said second portion of said one ball joint is in said first predetermined position of minimum stress and said second portion of said other ball joint is in said second predetermined position of minimum stress.

5. An apparatus as defined in claim 4 wherein said vehicle wheel supporting member has a surface portion against which said first portion of said other ball joint abuts.

6. An apparatus comprising:
a first member having first and second coaxial spaced apart passages;
a second member for supporting a vehicle wheel for steering movement about an axis relative to said first member corresponding with the axis of said passages, said second member having upper and lower openings therethrough coaxial with said first and second passages;
first and second ball joints for interconnecting said first and second members for relative pivotal movement about said axis;
said first ball joint having a first socket secured in said lower opening and a first stud supported on said first socket for rotational movement about said axis relative to said first socket and extending from said first socket into said first passage;
said second ball joint having a second socket secured in said upper opening and a second stud supported in said second socket for rotational movement about said axis relative to said second socket and extending from said second socket into said second passage;
said first member including means for locating the stud associated with one of said ball joints in a predetermined position in one of said passages, the stud associated with the other one of said ball joints being located in a position in the other one of said passages in response to positioning said stud associated with said one ball joint in said predetermined position;
means for securing said stud of said one ball joint in said predetermined positioned in said one passage; and
means for securing said stud of said other ball joint in the position in said other passage in which it is located in response to positioning said stud of said one ball joint, said means for securing said stud of said other ball joint including a pinch bolt for clamping portions of said first member around said stud of said other ball joint, said stud of said other ball joint having an axially extending groove along its outer perimeter through which said pinch bolt extends, said groove enabling the position of said stud of said other ball joint relative to said pinch bolt to vary.

7. An apparatus comprising:
a first member having first and second coaxial spaced apart passages;

a second member for supporting a vehicle wheel for steering movement about an axis relative to said first member corresponding with the axis of said passages, said second member having upper and lower openings therethrough coaxial with said first and second passages;

first and second ball joints for interconnecting said first and second members for relative pivotal movement about said axis;

said first ball joint having a first socket secured in said lower opening and a first stud supported in said first socket for rotational movement about said axis relative to said first socket and extending from said first socket into said first passage;

said second ball joint having a second socket secured in said upper opening and a second stud supported in said second socket for rotational movement about said axis relative to said second socket and extending from said second socket into said second passage;

said first member including means for locating the stud associated with one of said ball joints in a predetermined position in one of said passages, the stud associated with the other one of said ball joints being located in a position in the other one of said passages in response to positioning said stud associated with said one ball joint in said predetermined position, said means for locating the stud associated with one of said ball joints including a surface portion of said first member against which said stud of said one ball joint abuts and which closes said one passage in which said stud of said one ball joint is located to define a blind-hole;

means for securing said stud of said one ball joint in said predetermined position in said one passage, said means for securing said stud of said one ball joint including a first pinch bolt for clamping positions of said first member around said stud of said one ball joint, said stud of said one ball joint having an axially extending groove along its outer perimeter through which said first pinch bolt extends, said groove in said stud of said one ball joint enabling the position of said stud of said one ball joint relative to said first pinch bolt to vary; and means for securing said stud of said other ball joint in the position in said other passage in which it is located in response to positioning said stud of said one ball joint.

8. An apparatus as defined in claim 7 wherein said means for securing said stud of said other ball joint includes a second pinch bolt for clamping portions of said first member around said stud of said other ball joint, said stud of said other ball joint having an axially extending groove along its outer perimeter through which said second pinch bolt extends, said groove in said stud of said other ball joint enabling the position of said stud of said other ball joint relative to said second pinch bolt to vary.

9. An apparatus comprising:

first member having first and second coaxial spaced apart passages;

a second member for supporting a vehicle wheel for steering movement about an axis relative to said first member corresponding with the axis of said passages, said second member having upper and lower openings therethrough coaxial with said first and second passages;

first and second ball joints for interconnecting said first and second members for relative pivotal movement about said axis;

said first ball joint having a first socket secured in said lower opening and a first stud supported in said first socket for rotational movement about said axis relative to said first socket and extending from said first socket into said first passage;

said second ball joint having a second socket secured in said upper opening and a second stud supported in said second socket for rotational movement about said axis relative to said second socket and extending from said second socket into said second passage;

said first member including means for locating the stud associated with one of said ball joints in a predetermined position in one of said passages, the stud associated with the other one of said ball joints being located in a position in the other one of said passages in response to positioning said stud associated with said one ball joint in said predetermined position, said stud of said one ball joint being tapered and said means for locating the stud associated with one of said ball joints including a portion of said first member defining a tapered hole, said tapered hole receiving said tapered stud of said one ball joint;

means for securing said stud of said one ball joint in said predetermined position in said one passage; and means for securing said stud of said other ball joint in the position in said other passage in which it is located in response to positioning said stud of said one ball joint, said means for securing said stud of said other ball joint including a pinch bolt for clamping portions of said first member around said stud of said other ball joint, said stud of said other ball joint having an axially extending groove along its outer perimeter through which said pinch bolt extends, said groove enabling the position of said stud of said other ball joint relative to said pinch bolt to vary.

10. An apparatus comprising:

a vehicle frame member;

a vehicle wheel supporting member for supporting a vehicle wheel for steering movement about a steering axis relative to said vehicle frame member;

first and second ball joints for interconnecting said vehicle frame member and said vehicle wheel supporting member for relative movement about said steering axis;

each of said ball joints including a first portion secured to said vehicle wheel supporting member and a second portion secured to said vehicle frame member;

said vehicle frame member including means for locating said second portion of one of said ball joints in a predetermined position relative to said vehicle frame member;

said vehicle wheel supporting member comprising means for locating said second portion of the other one of said ball joints in a position relative to said vehicle frame member which is dependent upon said predetermined position of said second portion of said one ball joint; and a pinch bolt for clamping portions of said vehicle frame member around said second portion of said other ball joint, said second portion of said other ball joint having an axially extending groove along its outer perimeter through which said pinch bolt extends, said groove enabling the position of said second portion of said other ball joint relative to said pinch bolt to vary.

* * * * *

UNITED STATES PATENT AND TRADEMARK OFFICE
CERTIFICATE OF CORRECTION

PATENT NO. : 5,195,605

DATED : March 23, 1993

INVENTOR(S) : Ruey E. Wood

It is certified that error appears in the above-identified patent and that said Letters Patent is hereby corrected as shown below:

```
Column 7, line 40, after "stud" insert -- of --.

Column 7, line 45, change "on" to -- one --.

Column 7, line 48, delete "11" and insert -- 1 --.

Column 8, line 33, change "on" to -- in --.

Column 9, lines 36-37, delete "posi-tions" and insert
                    -- portions --.
```

Signed and Sealed this

Fourth Day of January, 1994

Attest:

BRUCE LEHMAN

Attesting Officer

Commissioner of Patents and Trademarks